Oct. 22, 1929.　　C. A. BRUST, JR　　1,732,962
FISHING TOOL
Filed March 31, 1927　　2 Sheets-Sheet 1
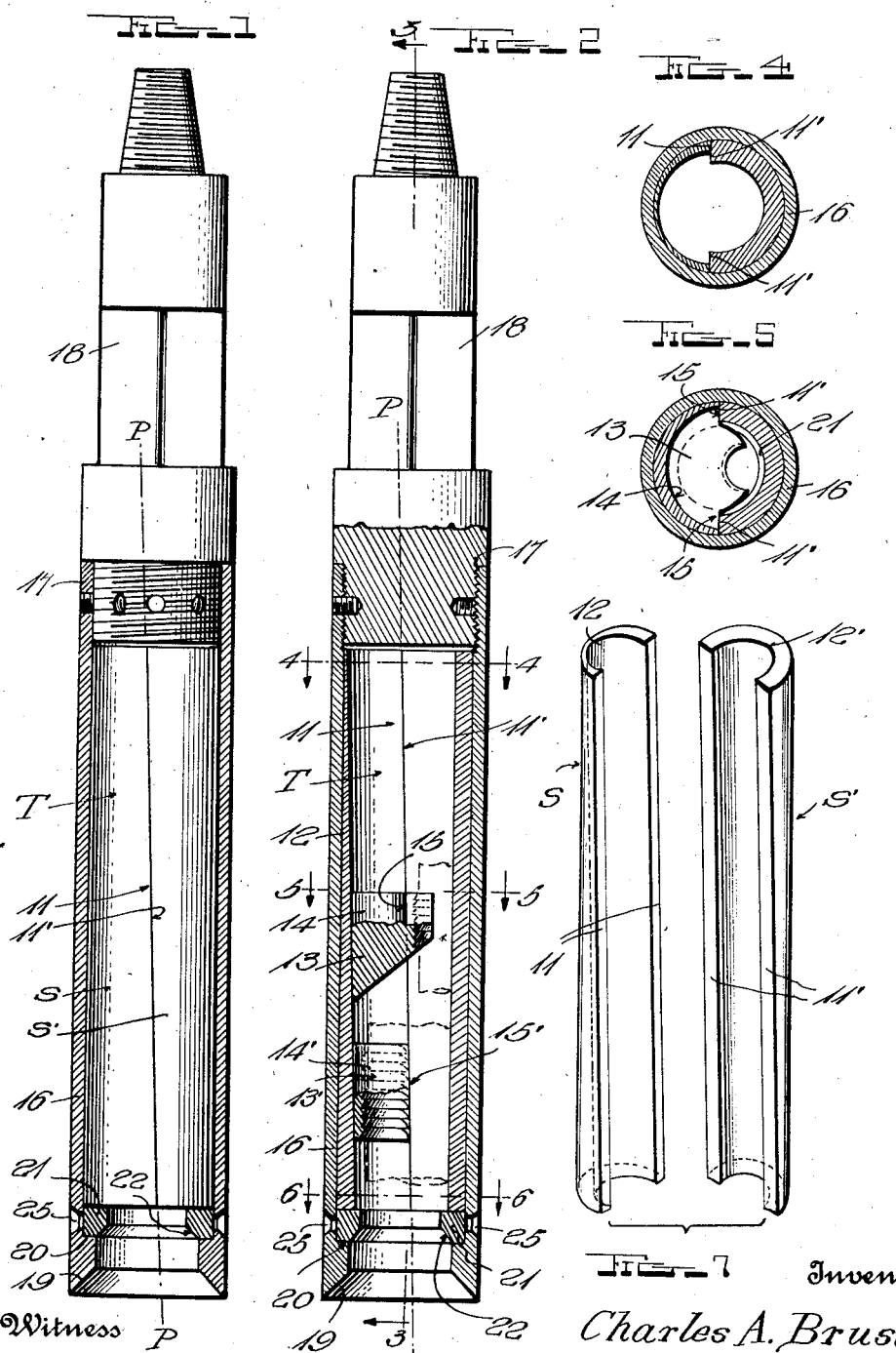
Inventor
Charles A. Brust, Jr.

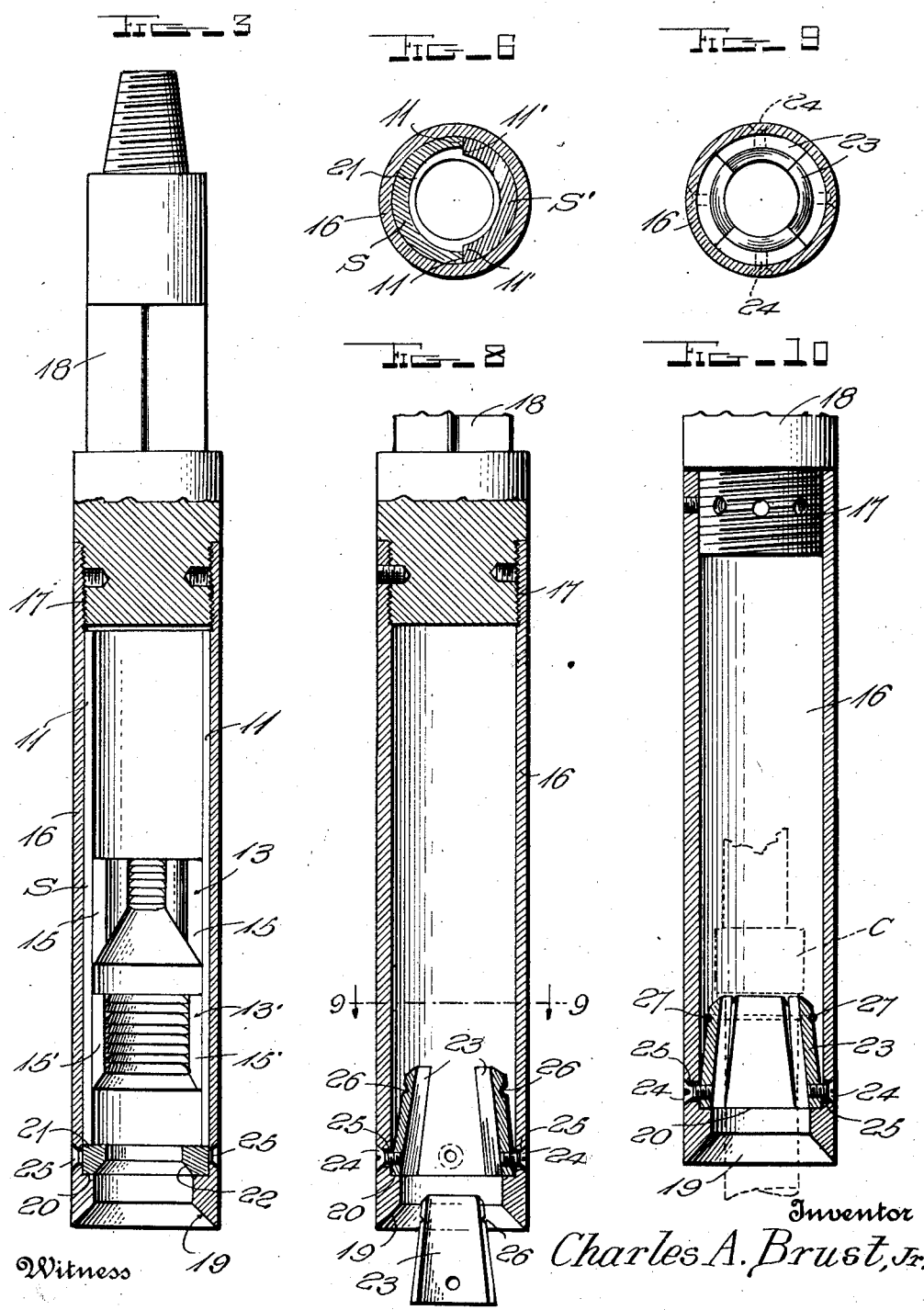

Patented Oct. 22, 1929

1,732,962

UNITED STATES PATENT OFFICE

CHARLES A. BRUST, JR., OF EL DORADO, ARKANSAS

FISHING TOOL

Application filed March 31, 1927. Serial No. 180,010.

The invention relates to fishing tools, designed for the recovery of broken or lost tools, rods, tubes and the like from drilled wells, and it is the principal object of such invention to provide a tool of the general type in which downward sliding of a slip under pull, produces increased gripping force on the rod or the like being raised, said tool being improved with a novel construction and relation of parts whereby the slip and its guide have full-surface contact with each other when the slip is in any position, thereby greatly diminishing if not entirely overcoming the danger of slip breakage prevalent whenever the slip is not solidly backed by its guide.

A further object of the invention is to provide a fishing tool which may be quickly and easily converted from one type to another, according to the nature of the object to be recovered.

Yet another aim is to provide a tool which, while being comparatively simple and inexpensive and easy to construct will be efficient and unusually durable, novel provision being made whereby the greatest strain may be received by different portions of the barrel of the tool, as the latter is successively operated.

With the foregoing in view, the invention resides in the novel subject matter hereinafter described and claimed, the description being supplemented by the accompanying drawings.

Fig. 1 is a side elevation partly in section.

Fig. 2 is a vertical longitudinal sectional view, partly in elevation.

Fig. 3 is a view similar to Fig. 2 but cut on the plane of line 3—3 thereof.

Figs. 4, 5 and 6 are horizontal sectional views on the correspondingly numbered lines of Fig. 2.

Fig. 7 is a perspective view of the two sections of the slip-guiding tube separated from each other.

Fig. 8 is a vertical section illustrating the manner in which the tool may be converted into different form.

Fig. 9 is a horizontal sectional view on line 9—9 of Fig. 8.

Fig. 10 is a sectional view through the converted tool, illustrating its manner of use.

The preferred construction has been shown and while it will be specifically described, it is to be understood that variations may be made.

In the drawings above briefly described, T denotes a slip-guiding tube which is divided longitudinally on a substantially vertical but steeply inclined plane, into two sections S and S', said plane being indicated by the dot and dash line P of Figs. 1 and 2. The longitudinal edges 11 of the section S, abut the corresponding edges 11' of the section S', and while both of these sections have the same external radius, the section S has a larger internal radius than the section S', exposing portions of the edges 11', at the interior of the tube T, as clearly shown in the horizontal sectional views.

The section S has a uniform, internal radius from its upper to its lower end, and the distance from one edge 11 to the other edge 11, measured in degrees around the inner surface of said section, is absolutely uniform from the upper end of this section to the lower end thereof. Thus, the longitudinal portion 12 of this section S, directly opposed to the plane P, is spaced a uniform distance from this plane at different elevations, as will be clear from Figs. 2 and 7.

The other section S' has the same internal radius from its upper to its lower end, but the distance between the edges 11', measured in degrees around the inner surface of said section S', gradually decreases from the upper to the lower end of said section. Thus, the longitudinal portion 12' of this section S', directly opposed to the plane P, will converge downwardly with this plane as seen in Fig. 2.

Upper and lower slips 13 and 13' have been shown, slidable within the tube section S, but it will be understood that only one or in fact any desired number of slips may be employed. The use of slips of different sizes and shapes, permits the grasping of different sized objects with the tool, without the necessity of inserting one slip or another each time the tool is to be used.

The slip 13 is formed with a surface 14 which is a true section or segment of a cylinder, and this surface contacts slidably with the inner surface of the tube section S. This slip is also provided with two flat, straight, longitudinal edges 15 which slidably engage the exposed portions of the edges 11', of the tube section S', as will be clear from Figs. 2 and 5.

The slip 13' is provided with surfaces 14' and 15', corresponding to the surfaces 14 and 15.

By forming the tube sections S and S' and the slips in the specific manner herein shown and described, they may readily be constructed with ordinary machine-shop equipment, without the necessity of having a number of special machines, as is very often necessary in order to construct slips and slip-guides such as those used in prior fishing tools. Hence, the specific features of construction which I have described, possess marked advantages for the manufacturer. Moreover, they are advantageous in the completed tool, as the slips may freely slide without binding, and an unusually durable construction is produced.

A cylindrical barrel 16 is provided to receive and retain the tube T and the slip or slips within the latter, the upper end of this barrel being detachably connected at 17, with the lower end of an appropriate body 18, which body may be connected with a drilling jar or with some other appropriate means for lowering it into a well. The connection 17 is by preference the same as that disclosed in my U. S. Patent No. 1,616,024 of February 1, 1927, but this is not essential.

The lower end of the barrel 16 is internally flared as indicated at 19, for easy passage over an object to be recovered, and said barrel is provided, preferably a short distance above the flare 19, with an internal, upwardly facing ledge 20. A ring 21 rests upon this ledge 20 and supports the tube T, said ring being of sufficient width to obstruct the lower end of the slip guideway, as illustrated in Figs. 2, 5 and 6, thus preventing accidental dropping of the slips out of the guideway or pulling of said slips out of place, when engaged with an object to be recovered.

The ring 21 is internally beveled as indicated at 22 to assist in guiding the tool or the like to be recovered, into the lower end of the fishing tool, and as the latter is further lowered, the broken or lost tool will come in contact with one or another of the slips 13, raising it until said broken or lost tool may enter between the slip and the face 12'. Then, the slip will drop somewhat by gravity and upon upward pulling of the fishing tool, the teeth of the slip will grip the tool being recovered. As the fishing tool is upwardly pulled, the downward convergence of the faces 12 and 12', causes the slip to move toward said face 12', thus effecting tenacious gripping of the tool to be recovered. Attention is here invited to the fact that the entire area of the outer side of the slip, contacts with the inner curved surface 12 of the tube half S, in any position of the slip. Thus, the slip is at all times solidly backed by the tube half or guide S and the danger of slip breakage is greatly reduced, it having been proven in actual practice that such reduction of breakage is at least ninety percent over fishing tools embodying tapered guides and slips. In such a tool, the slip is solidly backed by the guide in one position only of said slip. If such position be a neutral position, above that position the slip contacts only at its central longitudinal portion with the guide, and below said neutral position, said slip contacts with the guide only along lines outwardly spaced from said longitudinal central portion of the slip. Thus, there is severe danger of breaking the slip under strain, which danger is greatly reduced if not entirely overcome by shaping the slip and its guiding means as herein described. Obviously, this result could be attained also if the two tube halves S and S' were integral with each other instead of separate, and if the shoulders 11' were formed otherwise than by having said tube halves of different internal diameters. Moreover, it will be understood that by using the terms "half" or "halves", I do not restrict myself to an absolutely true half or halves.

Operation of the tool as above defined, exerts a strong force tending to separate the tube sections S and S' from each other, but they are held against such separation by the barrel 16. In resisting this strain, certain portions of the barrel will obviously be stressed a greater amount than other portions thereof. Hence, in order that different portions of the barrel may later receive the most strain, when the fishing tool is again operated, I leave the tube T free to rotate within the barrel, instead of clamping said tool tightly in place. Thus, danger of the barrel assuming an oval transverse formation, after repeated use, is effectively overcome and the life of the tool is greatly extended.

When fishing for objects such as that disclosed in Fig. 10, embodying a collar such as C, it is very often desirable to make use of overshot slips or jaws such as those illustrated at 23 in Figs. 8, 9 and 10. Certain parts of the tool, already described, readily permit the use of such slips or jaws. By disconnecting the body 18 from the barrel 16, the entire tube T and the contained slip or slips, may be bodily removed from said barrel. Then, the ring 21 may be removed, and as the internal diameter of the barrel 16 below said ring, is greater than the internal diameter of this ring, the slips or jaws 23 may be inserted into the barrel through said lower end of the latter, as will be clear from Fig. 8. These slips may be positioned by hand upon the ledge 20, and loosely connected with the barrel by appropriate screws 24 passed loosely through openings 25, with which the barrel is provided. The slips or jaws 23 are so shaped as to cause them to upwardly converge, and they are preferably formed with grooves 26 with which an elastic band or the like 27 may be engaged, to temporarily hold them in converging relation. However, when the tool is lowered and the slips or jaws encounter the collar C, they swing outwardly and then fall back into place beneath the collar, so that by now elevating the tool, the object may be recovered from the well.

On account of the excellent results obtainable from the exact details of construction herein disclosed, they are preferably followed. However, within the scope of the invention as claimed, variations may of course be made, as above stated.

I claim:—

1. In a fishing tool, a body, a barrel having its upper end connected detachably with said body, the lower end of said barrel being open and internally flared, and having an internal ledge; a slip-guiding tube removably retained in said barrel and having a slip guideway which opens at its lower end, and an internally beveled ring removably positioned in the barrel and resting upon the aforesaid ledge, said ring supporting said tube and obstructing the lower end of the slip guideway to prevent movement of the slip therefrom; the internal diameter of the barrel below said ledge being greater than the internal diameter of the ring; whereby upon removal of said ring and said tube, overshot slips may be inserted into the barrel through its lower end, and positioned upon said ledge.

2. In a fishing tool, a slip-guiding tube having substantially one of its longitudinal halves of greater internal diameter than its other longitudinal half, providing two longitudinal shoulders at the juncture of said halves, said shoulders being disposed in a plane which converges downwardly with the central longitudinal portion of said other tube half; said other tube half having an interior face of uninterrupted curvature and uniform radius from end to end, the distance in degrees measured around said interior face from one of said shoulders to the other being uniform from end to end of said face; and a slip having straight vertical edges contacting slidably with said shoulders, said slip being provided with a surface between said edges of uniform radius from its upper to its lower end contacting throughout its area with the full width of the aforesaid interior face of said other tube half in any position of the slip.

3. In a fishing tool, a vertically disposed slip-guiding tube divided in a substantially vertical though steeply inclined plane into two semi-tubular sections whose longitudinal edges abut each other, one section having a greater internal radius than the other section, leaving longitudinal edge portions of the latter exposed at the interior of the tube; said one section having an unbroken interior curvature and a uniform internal radius from end to end, and the distance in degrees measured around the interior face of said one section being uniform from end to end of said interior face; the interior longitudinal portion of said other section, opposed to the aforesaid plane, being disposed in downwardly converging relation with said plane; a slip slidable in said one section and having a face of uniform radius from its upper to its lower end, said face contacting throughout its area with the full width of said interior face of said one section in any position of the slip, said slip being provided with straight longitudinal edges uniformly spaced throughout their lengths and contacting slidably with the aforesaid exposed longitudinal edge portions of said other section.

4. In a fishing tool, a vertically disposed slip-guiding tube divided in a substantially vertical though steeply inclined plane into two semi-tubular sections whose longitudinal edges abut each other, one section having a greater internal radius than the other section leaving longitudinal edge portions of the latter exposed at the interior of the tube; said one section having an unbroken interior curvature and a uniform internal radius from end to end, and the distance in degrees measured around the interior face of said one section being uniform from end to end of said interior face; said other section having a uniform internal radius from end to end, the distance in degrees however, measured around the interior face of said other section, gradually decreasing toward the lower end thereof; a slip slidable in said one section and having a face of uniform radius from its upper to its lower end, said slip face contacting throughout its area with the full width of said interior face of said one tube section in any position of the slip, said slip being provided with straight longitudinal edges uniformly spaced throughout their lengths and contacting with the aforesaid exposed longitudinal edge portions of said other section.

5. In a fishing tool, a tube having longitudinal shoulders at substantially opposite locations and facing one-half of the tube, said shoulders being disposed at a steeply inclined plane which converges downwardly with the central longitudinal portion of the other tube half; said one tube half having an interior face of uninterrupted curvature and uniform radius from end to end, the distance in degrees measured around said interior face from one of said shoulders to the other being uniform from end to end of said face; and a slip having straight vertical edges contacting slidably with said shoulders, said slip being provided with a surface between said edges of uniform radius from its upper to its lower end and contacting throughout its area with the full width of the aforesaid interior face of said one tube half in any position of the slip.

In testimony whereof I have hereunto affixed my signature.

CHARLES A. BRUST. Jr.